United States Patent
Suciu et al.

(10) Patent No.: US 10,421,554 B2
(45) Date of Patent: Sep. 24, 2019

(54) DOUBLE PROPULSOR IMBEDDED IN AIRCRAFT TAIL WITH SINGLE CORE ENGINE

(71) Applicant: United Technologies Corporation, Hartford, CT (US)

(72) Inventors: Gabriel L. Suciu, Glastonbury, CT (US); Jesse M. Chandler, South Windsor, CT (US); Wesley K. Lord, South Glastonbury, CT (US); Alan H. Epstein, Lexington, MA (US); Steven M. O'Flarity, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 768 days.

(21) Appl. No.: 14/874,560

(22) Filed: Oct. 5, 2015

(65) Prior Publication Data

US 2017/0096232 A1 Apr. 6, 2017

(51) Int. Cl.
*B64D 35/06* (2006.01)
*B64D 27/20* (2006.01)
*B64D 27/14* (2006.01)

(52) U.S. Cl.
CPC ............ *B64D 35/06* (2013.01); *B64D 27/14* (2013.01); *B64D 27/20* (2013.01)

(58) Field of Classification Search
CPC ........ B64D 27/20; B64D 29/04; B64D 33/02; B64D 35/04; B64D 35/06; B64C 2001/0045; Y02T 50/12; F02C 3/107; F02C 7/36

USPC ............. 244/53 B, 54, 55, 60; 60/224, 226.1
See application file for complete search history.

(56) References Cited

U.S. PATENT DOCUMENTS

| | | | |
|---|---|---|---|
| 3,659,422 A | 5/1972 | Hope | |
| 4,254,619 A * | 3/1981 | Giffin, III | ............... F02K 3/075 244/55 |
| 4,462,206 A | 7/1984 | Aguet | |
| 4,679,394 A | 7/1987 | Taylor | |
| 4,996,836 A | 3/1991 | Reh et al. | |
| 5,778,659 A | 7/1998 | Duesler | |
| 5,966,525 A | 10/1999 | Manzi | |
| 6,260,800 B1 | 7/2001 | Snell | |
| 6,409,469 B1 | 6/2002 | Tse | |
| 6,439,840 B1 | 8/2002 | Tse | |
| 6,845,606 B2 | 1/2005 | Franchet | |
| 7,107,756 B2 | 9/2006 | Rolt | |
| 8,015,796 B2 * | 9/2011 | Babu | ..................... F01D 13/003 60/226.1 |
| 2003/0146344 A1 * | 8/2003 | Saito | ........................ F02C 3/10 244/55 |
| 2006/0011780 A1 * | 1/2006 | Brand | .................... B64D 35/04 244/60 |
| 2008/0099632 A1 * | 5/2008 | Addis | .................... B64D 27/14 244/53 B |

(Continued)

*Primary Examiner* — Tien Q Dinh
*Assistant Examiner* — Brady W Frazier
(74) *Attorney, Agent, or Firm* — Carlson, Gaskey & Olds, P.C.

(57) ABSTRACT

A drive arrangement for an aircraft comprises a pair of propulsor units each having a fan and a fan shaft for driving the fan. A core engine has a turbine driving a core engine shaft. A mechanical connection connects the core engine shaft to drive the fan shafts for each of the propulsor units. An aircraft also has such an arrangement.

4 Claims, 3 Drawing Sheets

(56) References Cited

U.S. PATENT DOCUMENTS

| | | | | |
|---|---|---|---|---|
| 2011/0168835 | A1* | 7/2011 | Oliver | B64C 29/0033 244/12.4 |
| 2013/0062463 | A1* | 3/2013 | Lord | B64D 27/14 244/55 |
| 2013/0327060 | A1* | 12/2013 | Christians | F02C 7/36 60/805 |
| 2014/0117152 | A1* | 5/2014 | Suciu | F02K 3/06 244/54 |
| 2014/0252161 | A1* | 9/2014 | Gukeisen | B64D 27/14 244/60 |
| 2015/0274306 | A1* | 10/2015 | Sheridan | F02C 7/36 60/772 |

* cited by examiner

DOUBLE PROPULSOR IMBEDDED IN AIRCRAFT TAIL WITH SINGLE CORE ENGINE

BACKGROUND OF THE INVENTION

This application relates to a single core engine having mechanical drives for driving two associated propulsor units in a tail section of an aircraft.

One proposed aircraft includes a body that is highly engineered and requires its engines to be mounted in the tail section. As envisioned, there will be at least one engine mounted within the tail. The fuselage leading up to the engine(s) may bend away from an outer surface, such that getting air to the engine(s) would be challenging due to the potential fuselage boundary layer conditions.

The foregoing aircraft will need a drive arrangement for driving the engine(s) mounted within the tail section while addressing the fuselage boundary layer conditions.

SUMMARY OF THE INVENTION

In a featured embodiment, a drive arrangement for an aircraft comprises a pair of propulsor units each having a fan and a fan shaft for driving the fan. A core engine has a turbine driving a core engine shaft. A mechanical connection connects the core engine shaft to drive the fan shafts for each of the propulsor units In another embodiment according to the previous embodiment, a pair of transfer drive shafts each connect the core engine shaft to respective ones of the fan shafts for each of the propulsor units.

In another embodiment according to any of the previous embodiments, one of the propulsor units is driven to rotate in a first direction and a second of the propulsor units is driven to rotate in an opposed direction.

In another embodiment according to any of the previous embodiments, there are gears between the transfer drive shaft, the core engine shaft, and the fan shafts and the gears result in the fans being driven at a slower speed than the core engine turbine.

In another embodiment according to any of the previous embodiments, an inlet housing to the core engine is vertically offset with respect to an inlet to the propulsor units.

In another embodiment according to any of the previous embodiments, one of the propulsor units is driven to rotate in a first direction and a second of the propulsor units is driven to rotate in an opposed direction.

In another embodiment according to any of the previous embodiments, there are gears between the transfer drive shaft, the core engine shaft, and the fan shafts and the gears result in the fans being driven at a slower speed than the core engine turbine.

In another embodiment according to any of the previous embodiments, an inlet housing to the core engine is vertically offset with respect to an inlet to the propulsor units.

In another embodiment according to any of the previous embodiments, there are gears between the transfer drive shaft, the core engine shaft, and the fan shafts and the gears result in the fans being driven at a slower speed than the core engine turbine.

In another embodiment according to any of the previous embodiments, an inlet housing to the core engine is vertically offset with respect to an inlet to the propulsor units In another featured embodiment, an aircraft comprises a fuselage, a tail, and a drive arrangement for an aircraft including a pair of propulsor units each having a fan and a fan shaft for driving the fan, a core engine having a turbine driving a core engine shaft. and a pair of transfer drive shafts each connecting the core engine shaft to respective ones of the fan shafts for each of the propulsor units. The drive arrangement is provided in the tail of the aircraft.

In another embodiment according to the previous embodiment, the core engine includes a compressor and a fan.

In another embodiment according to any of the previous embodiments, one of the propulsor units is driven to rotate in a first direction and a second of the propulsor units is driven to rotate in an opposed direction.

In another embodiment according to any of the previous embodiments, there are gears between the transfer drive shaft, the core engine shaft, and the fan shafts and the gears result in the fans being driven at a slower speed than the core engine turbine.

In another embodiment according to any of the previous embodiments, an inlet housing to the core engine is vertically offset with respect to an inlet to the propulsor units.

In another embodiment according to any of the previous embodiments, one of the propulsor units is driven to rotate in a first direction and a second of the propulsor units is driven to rotate in an opposed direction.

In another embodiment according to any of the previous embodiments, there are gears between the transfer drive shaft, the core engine shaft, and the fan shafts and the gears result in the fans being driven at a slower speed than the core engine turbine.

In another embodiment according to any of the previous embodiments, an inlet housing to the core engine is vertically offset with respect to an inlet to the propulsor units.

In another embodiment according to any of the previous embodiments, there are gears between the transfer drive shaft, the core engine shaft, and the fan shafts and the gears result in the fans being driven at a slower speed than the core engine turbine.

In another embodiment according to any of the previous embodiments, an inlet housing to the core engine is vertically offset with respect to a top of the fuselage.

These and other features may be best understood from the following drawings and specification.

DETAILED DESCRIPTION

Figure 1A:
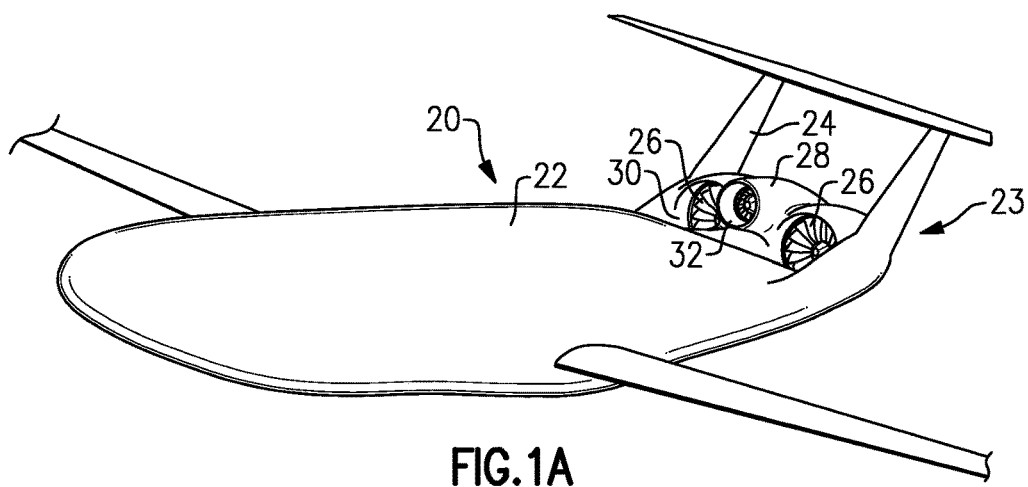
FIG. 1A shows an embodiment of an aircraft body.

FIG. 1A shows an aircraft 20 having a unique body in which the top of the fuselage 22 near the tail 24 dips downward, thereby creating a challenging boundary layer condition.

A drive arrangement 23 is embedded in the tail section 24. Two propulsor units 26 are shown along with a core engine 28 that will drive the propulsor units 26. As shown, an inlet 30 leading up to the propulsor units moves downwardly to better package the propulsor units 26. This can cause boundary layer challenges. The core engine 28 is positioned such that a vertically lowermost area 32 is vertically offset from the fuselage 22 of the aircraft and such that the boundary layer challenges will not be as pronounced for the core engine 28.

Figure 1B:
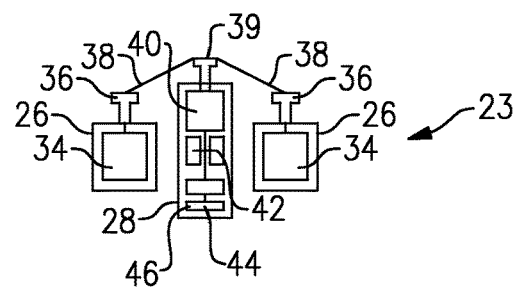
FIG. 1B schematically shows an embodiment of a drive arrangement for the aircraft of FIG. 1A.

FIG. 1B schematically shows the drive arrangement 23. As shown schematically, propulsor units 26 each have a fan 34 having a fan shaft 36 that is driven by a transfer shaft 38. Each of the transfer shafts 38, in turn, is driven by a single core engine shaft 39; the core engine shaft 39 is driven by a turbine 40 in the core engine 28. The core engine 28 also includes a combustion section 42, a compressor 44, and fan 46.

Figure 1C:
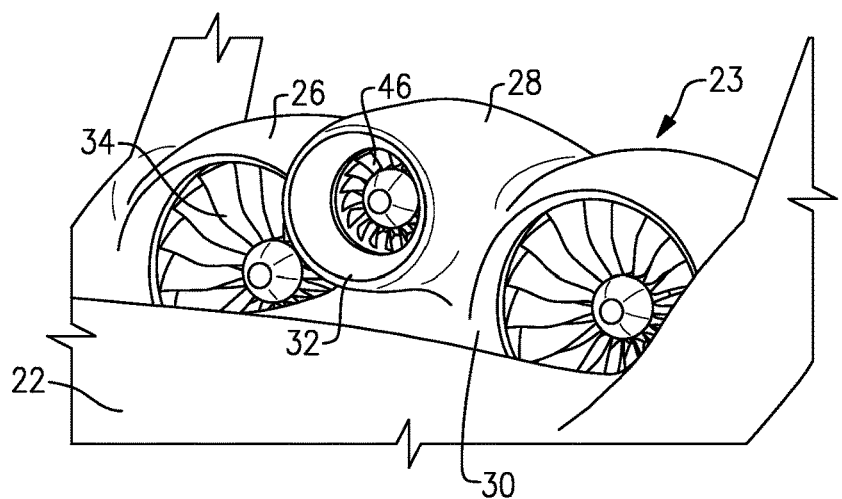
FIG. 1C is an enlarged view of a portion of FIG. 1A.

FIG. 1C shows a detail of the propulsor units 26, fan 34, the inlet 30, and the core engine 28 with its fan 46. The inlets 30 to propulsor units 26 curve downward from top of the fuselage 22 whereas the lowermost area 32 of the core engine is vertically offset upward relative to the propulsor units 26 so as to mitigate the fuselage boundary layer conditions caused by the downward relative positions of the propulsor units 26.

Figure 2:
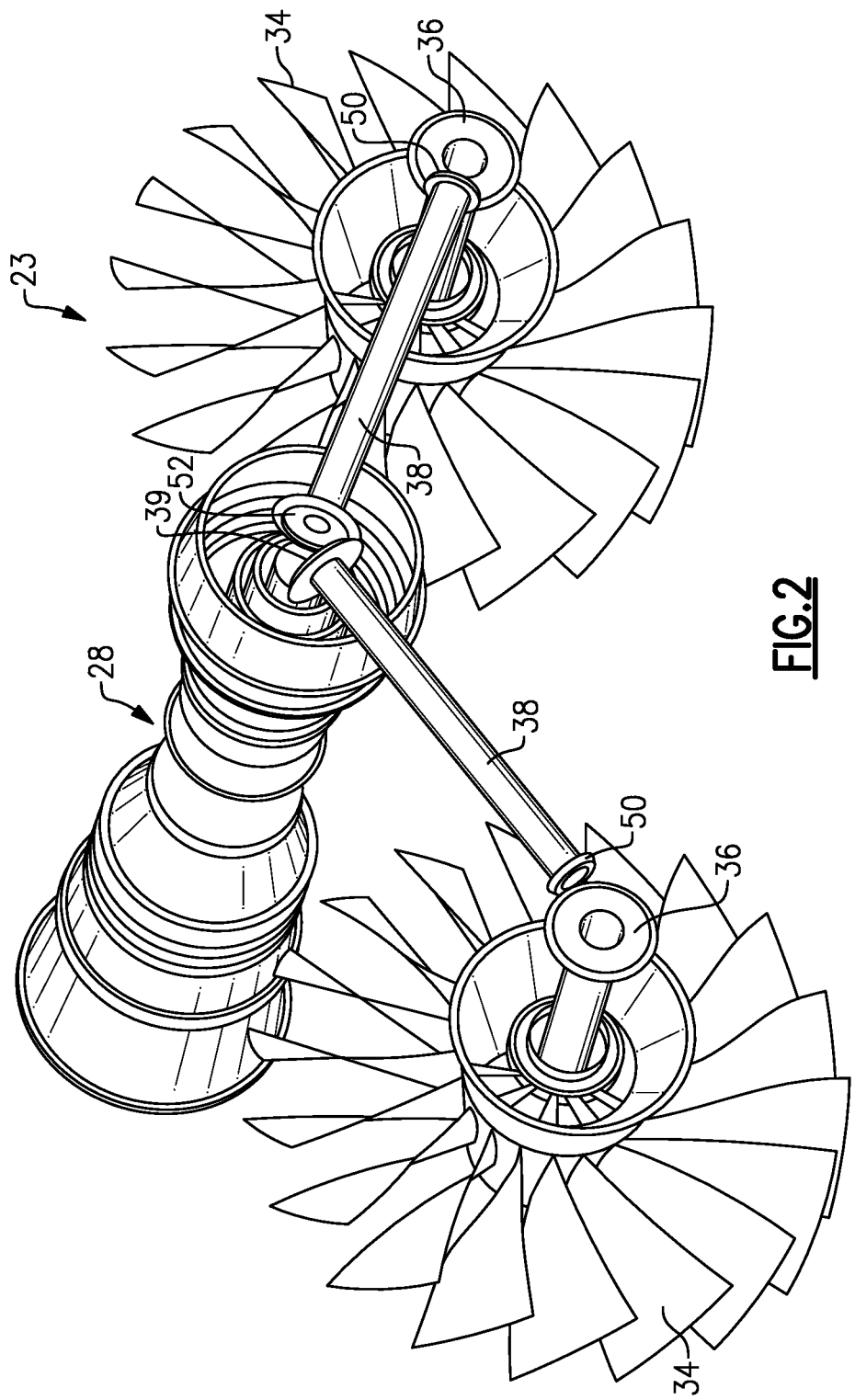
FIG. 2 shows the aircraft drive arrangement of FIG. 1B without the associated housings.

FIG. 2 shows a drive arrangement for the core engine 28 having the shaft 39 engaging double gears 52 on shafts 38. The shafts 38 drive a gear 50 which engages the shaft 36 to drive the fans 34 of the propulsor units. In one embodiment, the two fans 34 may be driven in different directions to balance power requirements between the two engines in the event of inlet flow angularity.

The various gears between the turbine shaft 39 and the shafts 36 may result in a speed reduction for the fans 34. While shafts and gears are illustrated to show the transmission of rotational drive, any other type of mechanical connection, such as a belt drive, etc., may be substituted.

Figure 3:
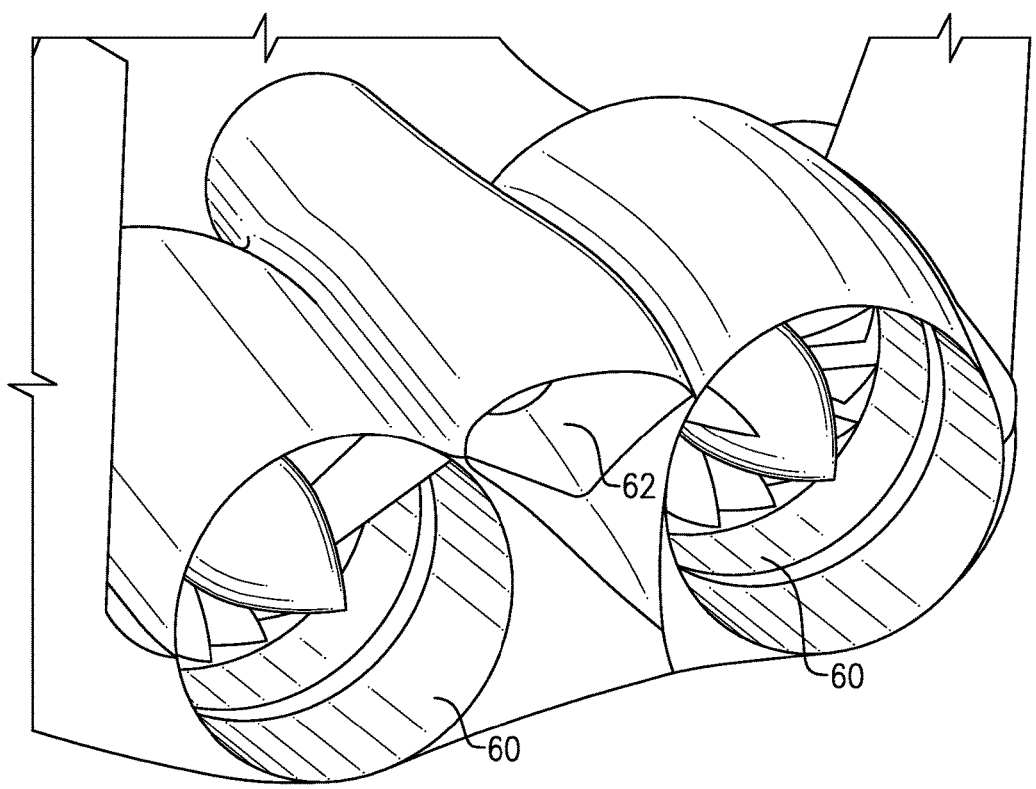
FIG. 3 shows the exhaust structure for the drive arrangement of FIG. 2.

FIG. 3 shows the exhausts 60 for the propulsor units being separate from an exhaust 62 for the core engine. In alternative embodiments, the exhausts 60 and 62 may be all mixed together.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A drive arrangement for an aircraft comprising:
   a pair of propulsor units each having a fan and a fan shaft for driving the fan;
   a core engine, the core engine having a turbine driving a core engine shaft;
   a mechanical connection to connect said core engine shaft to drive the fan shafts for each of said propulsor units;
   wherein a pair of transfer drive shafts each connect the core engine shaft to respective ones of the fan shafts for each of the propulsor units;
   wherein an inlet housing to the core engine is vertically offset with respect to an inlet to the propulsor units;
   wherein one of the propulsor units is driven to rotate in a first direction and a second of the propulsor units is driven to rotate in an opposed direction; and
   wherein there are gears between the transfer drive shaft, the core engine shaft, and the fan shafts and the gears result in the fans being driven at a slower speed than the core engine turbine.

2. The drive arrangement as set forth in claim 1, wherein the core engine includes a compressor and a fan.

3. An aircraft comprising:
   a fuselage;
   a tail; and
   the drive arrangement of claim 1, wherein the drive arrangement is provided in the tail of the aircraft.

4. The aircraft as set forth in claim 3, wherein the core engine includes a compressor and a fan.

* * * * *